US012679249B2

(12) United States Patent
Andersson et al.

(10) Patent No.: US 12,679,249 B2
(45) Date of Patent: Jul. 14, 2026

(54) METHOD OF CONTROLLING AN ELECTRIC POWER SYSTEM OF A FUEL CELL ELECTRIC VEHICLE

(71) Applicant: VOLVO TRUCK CORPORATION, Gothenburg (SE)

(72) Inventors: Arne Andersson, Mölnlycke (SE); Tove Audhav, Landvetter (SE); Fredrik Blomgren, Hisings Kärra (SE); Staffan Luong, Borås (SE); Eva Skvor, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 25 days.

(21) Appl. No.: 18/877,674

(22) PCT Filed: Jul. 4, 2022

(86) PCT No.: PCT/EP2022/068394
§ 371 (c)(1),
(2) Date: Dec. 20, 2024

(87) PCT Pub. No.: WO2024/008265
PCT Pub. Date: Jan. 11, 2024

(65) Prior Publication Data
US 2025/0376082 A1 Dec. 11, 2025

(51) Int. Cl.
*B60L 58/40* (2019.01)
*B60L 1/00* (2006.01)
(Continued)

(52) U.S. Cl.
CPC .............. *B60L 58/40* (2019.02); *B60L 1/003* (2013.01); *B60L 50/75* (2019.02); *B60L 58/13* (2019.02);
(Continued)

(58) Field of Classification Search
None
See application file for complete search history.

(56) References Cited

U.S. PATENT DOCUMENTS

| | | | |
|---|---|---|---|
| 9,238,418 B2 * | 1/2016 | Ryu | ...................... H01M 10/44 |
| 2009/0095549 A1 | 4/2009 | Dalum et al. | |

(Continued)

FOREIGN PATENT DOCUMENTS

| | | |
|---|---|---|
| DE | 102014215160 A1 | 2/2016 |
| DE | 102016007545 A1 | 12/2017 |

(Continued)

OTHER PUBLICATIONS

International Search Report and Written Opinion of the International Searching Authority in corresponding International Application No. PCT/EP2022/068394 mailed Feb. 21, 2023 (17 pages).
(Continued)

*Primary Examiner* — Brandon D Lee
(74) *Attorney, Agent, or Firm* — Jeffri A. Kaminski; Venable LLP

(57) ABSTRACT

A computer implemented method controls an electric power system of a fuel cell electric vehicle (FCEV). The electric power system has a fuel cell and an energy storage system electrically connected to each other. An upcoming position at which the electric power system will assume a low load operation mode is determined, and the electric power system is controlled based on a power distribution scheme to arrive at the upcoming position with a state of charge level of the energy storage system below a predetermined threshold level, whereafter the electric power system is controlled to feed electric power at least to the energy consumer when the electric power system assumes the low load operation mode at the upcoming position.

20 Claims, 4 Drawing Sheets

(51) Int. Cl.
B60L 50/75 (2019.01)
B60L 58/13 (2019.01)

(52) U.S. Cl.
CPC ....... *B60L 2200/36* (2013.01); *B60L 2240/62*
(2013.01); *B60L 2240/642* (2013.01); *B60L*
*2260/22* (2013.01); *B60L 2260/54* (2013.01)

(56) References Cited

U.S. PATENT DOCUMENTS

| | | |
|---|---|---|
| 2014/0277931 A1 | 9/2014 | Crowe |
| 2014/0288737 A1 | 9/2014 | Ryu et al. |
| 2015/0134174 A1 | 5/2015 | Preece |
| 2023/0271532 A1* | 8/2023 | Tu ........................... B60L 50/75 |
| | | 701/22 |

FOREIGN PATENT DOCUMENTS

| | | |
|---|---|---|
| EP | 3173304 A1 | 5/2017 |
| WO | 21105205 A1 | 6/2021 |
| WO | 2022033308 A1 | 2/2022 |

OTHER PUBLICATIONS

Written Opinion of the International Preliminary Examining Authority in corresponding International Application No. PCT/EP2022/068394 mailed Mar. 21, 2024 (7 pages).
Written Opinion of the International Preliminary Examining Authority in corresponding International Application No. PCT/EP2022/068394 mailed May 31, 2024 (9 pages).
International Preliminary Report on Patentability in corresponding International Application No. PCT/EP2022/068394 mailed Jul. 24, 2024 (9 pages).

\* cited by examiner

METHOD OF CONTROLLING AN ELECTRIC POWER SYSTEM OF A FUEL CELL ELECTRIC VEHICLE

CROSS-REFERENCE TO RELATED APPLICATIONS

This application is a U.S. National Stage application of PCT/EP2022/068394, filed Jul. 4, 2022 and published on Jan. 11, 2024, as WO 2024/008265, all of which is hereby incorporated by reference in its entirety.

TECHNICAL FIELD

The present invention relates to an electric power system comprising an energy storage system and a fuel cell. In particular, the invention relates to a method of controlling such electric power system. The invention is applicable on so-called fuel cell electric vehicles (FCEV), in particular medium- and heavy-duty FCEVs. Although the invention will be described with respect to a heavy-duty FCEV in the form of a truck, the disclosure is not restricted to this particular vehicle, but may also be used in other FCEVs.

BACKGROUND

Electrified propulsion of passenger cars is becoming a conventional solution to reduce the environmental effect caused by vehicles. Heavy-duty vehicles, such as trucks, are also continuously developed to be able to provide electrified propulsion. The electrified propulsion system comprises one or more electric machines operable to generate a propulsion torque on one or more wheels of the vehicle.

However, heavy duty vehicles require a large energy capacity of the batteries feeding electric power to the electric machines in order to provide a desirable vehicle operational range. The electric capacity of the batteries is thus a limiting factor for the heavy-duty vehicles.

Using a fuel cell to generate electric power during operation of the vehicle is one approach to increase the operational range for heavy-duty vehicles. The electric power generated by the fuel cell can be fed to the battery/batteries, or fed directly to the electric machine propelling the vehicle. To reduce degradation of the fuel cell, the fuel cell should preferably not be turned off during operation of the FCEV. However, during particular operating conditions, the energy storage system might not be able to receive the electric power generated by the fuel cell, due to e.g. the state of charge level of the energy storage system being above a certain limit. In such a case, the electric power generated by the fuel cell would have to be dissipated or the fuel cell turned off. Dissipating electric energy is not efficient and, as previously mentioned, there is a desire to not shut down the fuel cell. Thus, a solution where both these can be avoided is desired.

According to its abstract, US 2014/277931 relates to power systems and methods that can provide power system management and power delivery, among other functionality. The power systems and methods for a vehicle can employ a fuel cell, such as a Solid Oxide Fuel Cell (SOFC), as a power source in conjunction with another power sources, such as one or more vehicle batteries, capacitors, etc. The fuel cell can be conditionally used to provide power to the electrical system, thereby reducing the load on the vehicle batteries.

According to its abstract, US 2014/288737 relates to a method of controlling power of the fuel cell vehicle includes dividing an expected driving path of the fuel cell vehicle into a plurality of sections and setting the plurality of sections according to a gradient, and comparing whether a predicted battery state of charge variation is within a battery charging/discharging allowance range for each of the plurality of divided sections The method further includes comparing predicted power with a predetermined maximum allowance power for each of the plurality of divided sections, and setting the plurality of divided sections as a battery charging/discharging prohibition section and a battery charging/discharging allowance section in advance according to a result of the comparison of the predicted battery state of charge variation and the predicted power.

Further, EP 3 173 304 describes in its abstract a method for determining and optionally in addition to implementing an optimal route for a vehicle or by the vehicle, wherein the vehicle comprises an electric drive with an energy storage and comprises a converter, wherein the converter is operated by means of a fuel, wherein the converter Energy storage of the electric drive is chargeable, comprising the steps Predetermining a target position Z by the user, Determining one or more possible routes from the current position A to the destination position Z, the determination depending on the geographical location of both fuel stations and fuel charging stations in the area between the current position A and the destination position Z, —determining the optimal route by selecting from the determined possible routes, Optionally, implementing the optimal route by purposefully operating the converter to charge the energy storage while traveling the optimal route.

According to a further state of the art document, WO 2022/033308 relates to a FCEV energy management method and system.

SUMMARY

It is thus an object of the present disclosure to mitigate the above-described deficiencies.

According to a first aspect, there is provided a computer implemented method of controlling an electric power system of a fuel cell electric vehicle (FCEV), the electric power system comprising a fuel cell and an energy storage system electrically connected to each other, wherein the FCEV comprises an electric traction motor connected to the electric power system, the electric power system being configured to feed electric power to the electric traction motor at a propulsion power level range during propulsion, and to receive electric power, generated by the electric traction motor, during braking, the electric power system being operable to assume a low load operation mode, in which electric power is fed to an energy consumer of the FCEV at a power level below the propulsion power level range, and processing circuitry operatively coupled to the energy storage system, the method comprising determining, by the processing circuitry, a upcoming position at which the electric power system will assume the low load operation mode; determining, by the processing circuitry, a current state of charge level of the energy storage system; determining, by the processing circuitry, a power distribution scheme between the electric power system and the electric traction motor for arriving at the upcoming position with a state of charge level of the energy storage system below a predetermined threshold level; controlling, by the processing circuitry, the electric power system based on the power distribution scheme; and controlling, by the processing circuitry, the electric power system to feed electric power at least to the energy consumer when the electric power system assumes the low load operation mode at the upcoming position.

The energy consumer should be construed as a component or structure of the FCEV which consumes electric power from the electric power system. The energy consumer may, for example, be the vehicle head lights, the infotainment system of the vehicle, or even control unit(s) of the FCEV operable by electric power. According to a preferred example embodiment, the energy consumer may be a vehicle auxiliary system electrically connected to the electric power system. The vehicle auxiliary can be e.g. a crane operable by an operator of the vehicle for loading and unloading of material to/from the FCEV.

The upcoming position at which the electric power system will assume the low load operation mode can be determined based on e.g. map data, statistical data from previous usage of the ego vehicle or other vehicles, i.e. historical data. The upcoming position may thus be a predetermined upcoming position. Accordingly, and according to an example embodiment, the method may further comprise determining, by the processing circuitry, the upcoming position at which the electric power system will assume the low load operation mode based on map data. The history data can be received from e.g. artificial intelligence. Also, historical data can be received from a back office or cloud stored memory, etc. or from a memory forming part of a control unit arranged in the vehicle. Hence, and according to an example embodiment, the method may further comprise determining, by the processing circuitry, the upcoming position at which the electric power system will assume the low load operation mode based on previous vehicle usage.

The upcoming position is thus a position at which the electric power system assumes the low load operation mode and feeds electric power to the energy consumer. According to a non-limiting example, the upcoming position may be a traffic jam ahead of the vehicle. In such case, the electric power system feeds electric power to e.g. power electronics controlling operation of the vehicle head lights, or power electronics controlling operation of other electric energy consumers active when the vehicle is standing still in the que of the traffic jam. According to another non-limiting example, the upcoming position may be a loading/unloading position at which the vehicle is standing still and is loaded/ unloaded by an energy consumer in the form of the above-described vehicle auxiliary.

Moreover, and as described above, low load operation mode is thus a mode at which electric power at a level below the propulsion level range. Hence, the electric power system is preferably not able to feed sufficient electric power to the electric traction motor for its propulsion of the FCEV when assuming the low load operation mode. The power fed to the energy consumer during the low load operation mode can be a range, i.e. it does not have to be a fixed power level.

Further, the processing circuitry preferably determines the topology of the upcoming road path for arriving at the upcoming position. The energy consumption for operating the FCEV along the upcoming road path can thus be determined. Hereby, one alternative of arriving at the upcoming position with a state of charge level below the predetermined threshold level is given. Accordingly, and according to an example embodiment, the power distribution scheme is based on the topology of the upcoming road path. The road topology should in this context be construed as a variation of uphill slopes and downhill slopes of the upcoming road path. The upcoming road path may thus comprise one or more uphill slopes of various angles and lengths, as well as one or more downhill slopes of various angles and lengths. The power distribution scheme should be construed as a determined energy consumption of the electric power system along the road path until arriving at the upcoming position. The power distribution scheme thus preferably includes feeding electric power at different rates from the electric power system to the electric traction motor during propulsion, and charging the energy storage system at different rates by feeding electric power, generated by the electric traction motor during braking, to the energy storage system. Accordingly, and according to an example embodiment, the method may further comprise determining, by the processing circuitry, an electric energy consumption of the electric traction motor for arriving at the upcoming position; wherein the power distribution scheme is based on the determined electric energy consumption. The power distribution scheme also preferably includes the level of electric power generated by the fuel cell until arriving at the upcoming position.

The present invention is based on the insight that by determining an upcoming position at which the electric power system will assume the low load operation mode, the electric power system can be controlled before arriving at this position in such a way that the state of charge level of the energy storage system is below the predetermined threshold level when finally arriving at the upcoming position. An advantage is that, when arriving at this position, the state of charge level is at such a low level that the fuel cell can be operated to generate electric power and any excess electric power that is not consumed by the energy consumer can be fed to the energy storage system. Accordingly, the fuel cell does not have to be turned off or electric power does not need to be dissipated. Hence, the degradation rate of the fuel cell is reduced, and electric energy is not wasted.

According to an example embodiment, method may further comprise determining, by the processing circuitry, a desired state of charge level of the energy storage system when ending the low load operation mode; determining, by the processing circuitry, an energy consumption level of the energy consumer during the low load operation mode; and determining, by the processing circuitry, a charging level of the energy storage system by the fuel cell during the low load operation mode; wherein the predetermined threshold level of the energy storage system when arriving at the upcoming position is based on the desired state of charge level and a difference between the charging level of the energy storage system and the energy consumption level of the energy consumer.

Accordingly, the predetermined threshold level of the energy storage system is based on e.g. subsequent usage of the FCEV when the low load operation mode has ended. It can hereby be assured that the FCEV will be able to manage also future missions, i.e. the electric power system will be able to operate the electric traction motor in a desirable manner. Preferably, and according to an example embodiment, the desired state of charge level of the energy storage system may be based on topology data of a road path operable by the FCEV after the low load operation mode has ended.

The road topology should in this context be construed as a variation of uphill slopes and downhill slopes of the upcoming road path. The upcoming road path may thus comprise one or more uphill slopes of various angles and lengths, as well as one or more downhill slopes of various angles and lengths.

According to an example embodiment, the electric power system may be controlled to feed electric power from the fuel cell to the energy consumer when assuming the low load operation mode. Hereby, the energy consumer primarily consumes electric energy from the fuel cell. As indicated above, excess electric energy is preferably fed to the energy storage system.

According to an example embodiment, the determined electric energy consumption may be based on scheduled operational information of the electric traction motor for propelling the FCEV from a present position to the upcoming position. Hereby, the level of electric power that is consumed by the electric traction motor during propulsion can be determined, as well as the level of electric power generated by the electric traction motor during braking. As an alternative or complement, and according to according to an example embodiment, the method may further comprise determining, by the processing circuitry, a road topology for a road path from a present position to the upcoming position to be operated by the FCEV; and wherein the determined electric energy consumption is based on the road topology from the present position to the upcoming position.

According to an example embodiment, the method may further comprise dividing, by the processing circuitry, an upcoming road path from a current position to the upcoming position into a plurality of road path sections, each road path section being associated with individual road topology data; wherein the electric energy consumption of the electric traction motor is determined for each road path section.

By dividing the road path into the plurality of road path sections, the computational effort to estimate the electric energy consumption along the entire road trip is reduced compared to an estimation of the electric energy consumption along the entire road path to the upcoming position. Preferably, and according to an example embodiment, the method may further comprise setting, by the processing circuitry, a desired state of charge level of the energy storage system at the upcoming position, the desired state of charge level being below the predetermined threshold level; determining, by the processing circuitry, a desired electric energy capacity of the electric power system for each road path sections to arrive at the end position with the desired state of charge level of the energy storage system, the desired electric energy capacity for each road path section being based on its next coming road path section; and controlling, by the processing circuitry, the electric power system based on the desired electric energy capacity of each road path section. A backwards calculation is thus made based on the desired state of charge level at the end position of the upcoming road path. Hence, the FCEV should not only be able to be operated without draining the energy storage system, but also to arrive at the end position with the desired state of charge level. Should the processing circuitry determine that this is not possible by controlling the fuel cell to assume the cruise mode, the fuel cell should be controlled to assume the power mode throughout the entire upcoming road path, i.e. for each road path sections, until arriving at the end position. The end position thus corresponds to the upcoming position.

According to an example embodiment, the method may further comprise controlling, by the processing circuitry, the electric power system to feed electric power solely from the energy storage system to the electric traction motor during at least a portion of a travelling distance from a present position to the upcoming position when the current state of charge level of the energy storage system is above an upper threshold level. It should thus be understood that the fuel cell is still operated, i.e. not turned off, and feeds electric power to the energy storage system. Since the electric traction motor consumes more electric energy compared to the electric energy generated by the fuel cell, it can be assured that the energy storage system will be drained, at least in part, from electric energy when arriving at the upcoming position. Also, when the state of charge level is above the upper threshold level, it will be necessary to feed power solely from the energy storage system to the electric traction motor to arrive at the upcoming position with a state of charge level below the predetermined threshold level. The predetermined threshold level is thus in this example a lower predetermined threshold level.

According to an example embodiment, the fuel cell may be operable to assume an idle mode in which the fuel cell generates electric power at a first power level, and a power mode in which the fuel cell generates electric power at a second power level, the second power level being higher than the first power level.

The idle mode should be construed as the "sweet spot" for the fuel cell, i.e. the fuel cell is operated to generate electric power level at which a degradation rate of the fuel is kept at a minimum. When assuming the idle mode, the fuel cell generates electric power somewhere in the middle of its power range, i.e. at medium power. The fuel cell should thus preferably be operated as much as possible to assume the idle mode. Preferably, and according to an example embodiment, the fuel cell may assume the idle mode when the electric power system assumes the low load operation mode. The fuel cell is thus operated at its optimum mode of operation also when assuming the low load operation mode.

According to an example embodiment, the fuel cell may assume the idle mode when the electric power system is controlled to feed electric power from the energy storage system to the electric traction motor for arriving at the upcoming position. An advantage is that the fuel cell is operated at its optimum and further electric power that is consumed by the electric traction motor for arriving at the upcoming position is received from the energy storage system.

According to an example embodiment, the FCEV may be arranged in a stand-still operating mode when the electric power system assumes the low load operation mode.

The stand-still operating mode should be construed as a mode at which the FCEV is standing still, preferably with parking brakes engaged. Thus, the electric traction motor is not propelling the vehicle during the stand-still operating mode.

According to an example embodiment, the energy consumer may be a vehicle auxiliary system electrically connected to the electric power system.

The vehicle auxiliary may, for example be, a crane positioned rearwards of a vehicle cabin. Another vehicle auxiliary may be a winch, etc.

According to an example embodiment, the energy consumer may consume electric power at a power level below the power level generated by the fuel cell when the electric power system assumes the low load operation mode, wherein a difference between electric power generated by the fuel cell and the electric power consumed by the energy consumer is fed from the fuel cell to the energy storage system when the electric power system assumes the low load operation mode. Since the energy storage system is controlled to have a state of charge level below the predetermined threshold level when arriving at the upcoming position, the energy storage system will be able to receive electric power generated by the fuel cell and electric energy does not need to be dissipated and wasted.

According to a second aspect, there is provided an electric power system of a fuel cell electric vehicle (FCEV), the electric power system comprising a fuel cell, an energy storage system electrically connected to the fuel cell, and a control unit connected to the fuel cell, the electric power system being configured to feed electric power to an electric traction motor of the FCEV during propulsion at a propulsion power level range, and to assume a low load operation mode in which the electric power system feeds electric power to a energy consumer of the FCEV at a power level below the propulsion power level range, the control unit being configured to determine an upcoming position in which the electric power system will assume the low load operation mode; determine a current state of charge level of the energy storage system; determine a power distribution scheme between the electric power system and the electric traction motor for arriving at the upcoming position with a state of charge level of the energy storage system below a predetermined threshold level; control the electric power system based on the power distribution scheme; and control the electric power system to feed electric power at least to the energy consumer when the electric power system assumes the low load operation mode at the upcoming position.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Effects and features of the second aspect are largely analogous to those described above in relation to the first aspect.

According to a third aspect, there is provided a fuel cell electric vehicle (FCEV) comprising an electric power system according to the second aspect.

According to a third aspect, there is provided a vehicle comprising a system according to the second aspect.

According to a fourth aspect, there is provided a computer program comprising program code means for performing the method of any of the embodiments described above in relation to the first aspect when the program is run on a computer.

According to a fifth aspect, there is provided a non-transitory computer readable medium carrying a computer program comprising program code for performing the method of any of the embodiments described above in relation to the first aspect when the program product is run on a computer.

According to a sixth aspect, there is provided a control unit for controlling an auxiliary system of a transportation vehicle, the control unit being configured to perform the method according to any of the embodiments described above in relation to the first aspect.

Effects and features of the third, fourth, fifth and sixth aspects are largely analogous to those described above in relation to the first aspect.

Further features of, and advantages with, the present disclosure will become apparent when studying the appended claims and the following description. The skilled person realizes that different features of the present disclosure may be combined to create examples other than those described in the following, without departing from the scope of the present disclosure.

BRIEF DESCRIPTION OF THE DRAWINGS

The above, as well as additional objects, features, and advantages of the present disclosure, will be better understood through the following illustrative and non-limiting detailed description of exemplary examples of the present disclosure, wherein.

DETAIL DESCRIPTION

Figure 1:
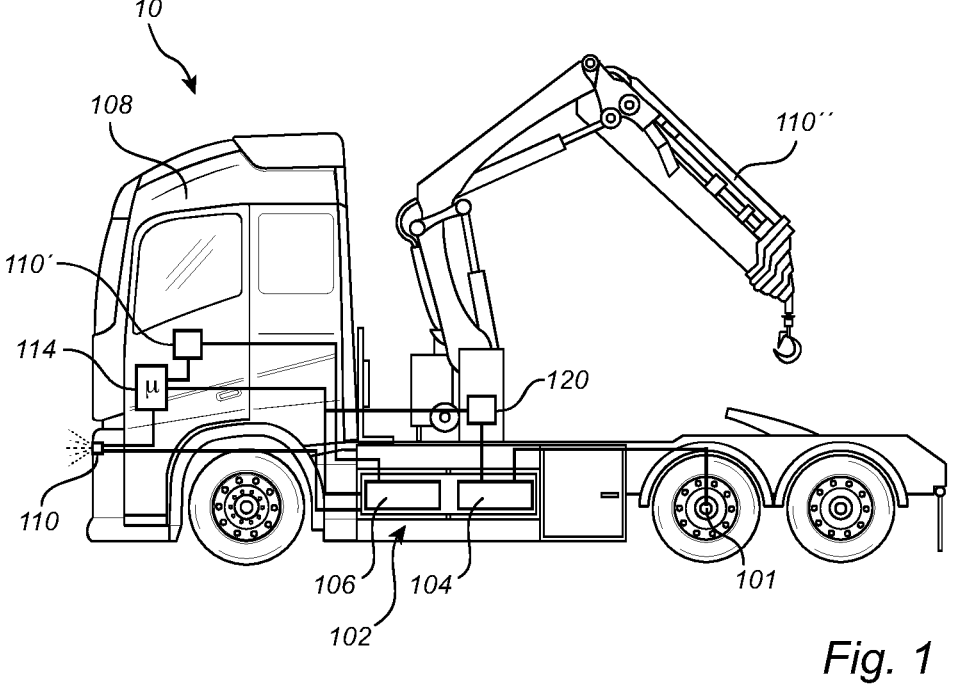
FIG. 1 is lateral side view of a transportation vehicle in the form of a truck according to an example.

The present disclosure will now be described more fully hereinafter with reference to the accompanying drawings, in which exemplary examples are shown. The disclosure may, however, be embodied in many different forms and should not be construed as limited to the examples set forth herein; rather, these examples are provided for thoroughness and completeness. Like reference character refer to like elements throughout the description.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

With particular reference to FIG. 1, there is depicted a fuel cell electric vehicle (FCEV) 10 in the form of a truck. The FCEV 10 will in the following merely be referred to as a vehicle and comprises an electric traction motor 101 for propelling the wheels of the vehicle. The electric traction motor 101 is in the example embodiment arranged in the form of an electric machine. The electric traction motor 101 is arranged to receive electric power from an electric power system 102 during propulsion, and to feed electric power generated by the electric machine 101 during braking to an energy storage system 104 of the electric power system. The energy storage system 104 is preferably a high voltage battery of the vehicle 10. As will be evident from the below disclosure, in particular in relation to FIG. 5, the electric power system 102 also comprises a fuel cell 106 electrically connected to the energy storage system 104. The fuel cell 106 is configured to generate electric power upon receiving hydrogen fuel and oxygen.

The vehicle 10 also comprises a control unit 114 connected to the electric power system 102 for controlling operation thereof. The control unit 114 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

Moreover, the vehicle 10 comprises a plurality of energy consumers 110, 110', 110". The energy consumers 110, 110', 110" should be construed as components or structures of the vehicle 10 which receives electric energy from the electric power system for their operation. In FIG. 1, the energy consumers 110, 110', 110" are exemplified as the vehicle head light system 110, the infotainment system 110' arranged in the cabin 108 of the vehicle 10, and a vehicle auxiliary 110" in the form of a crane. In the latter example, the vehicle auxiliary 110" preferably comprises an electric motor 120 for operating the crane. Each of these energy consumers is electrically connected to the electric power system 102, as well as controllable by the control unit 114. Obviously, the vehicle 10 comprises a wide variety of further energy consumers but which are not described for simplifying for the reader.

During propulsion of the vehicle 10, electric power is generated by the fuel cell 106, which electric power is fed to the energy storage system 104, thereby charging the energy storage system 104 with electric energy. The energy generated by the fuel cell 106 may also be fed directly to the electric traction motor 101 during propulsion. Electric power is also preferably fed from the energy storage system 104 to the electric traction motor 101 during propulsion. Thus, when propelling the vehicle 10, the energy storage system 10 is steadily drained from electric energy which is consumed by the electric traction motor 101.

In order to reduce degradation of the fuel cell 106, the fuel cell 106 should preferably not be operated in power mode as well as not be turned off. On the contrary, the fuel cell 106 should preferably be operated in idle mode in order to reduce degradation thereof. In the power mode, the fuel cell 106 generates electric power at a relatively high level and in the idle mode the fuel cell 106 generates electric power at a relative moderate level. When operating the vehicle 10 and arriving at a position in which the vehicle is standing still, i.e. the electric traction motor is turned off and does not consume electric power from the electric power system 102, the fuel cell 106 should preferably not be turned off. In these situations, the electric power system 102 is operable to assume a low load operation mode, in which electric power is fed from the electric power system 102 to at least one of the above-described energy consumers. When the electric power system 102 assumes the low load operation mode, the electric power system feeds electric power to the energy consumer at a power level below a propulsion power level range fed to the electric traction motor 101 during propulsion.

Figures 2, 3:
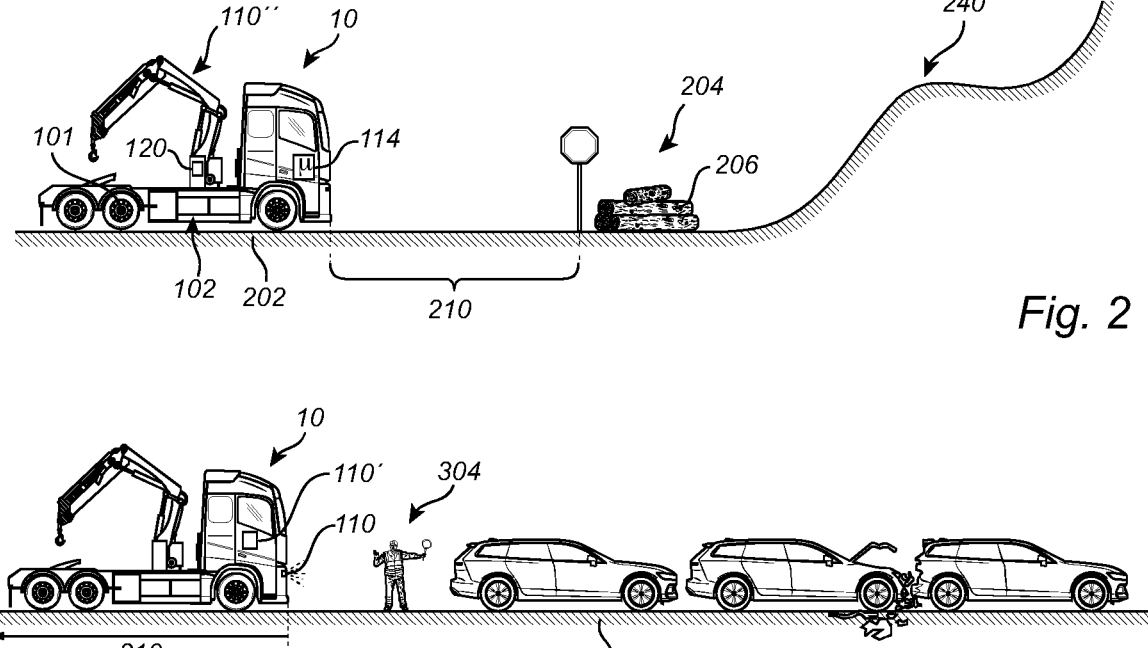
FIG. 2 illustrates the vehicle operating at a road path for arriving at an upcoming position according to an example embodiment.
FIG. 3 illustrates the vehicle operating at a road path for arriving at an upcoming position according to another example embodiment.

However, if the state of charge level of the energy storage system 104 is above a predetermined threshold level when the vehicle 10 is standing still and electric power is fed to the energy consumer(s) 110, 110', 110", any excess electric energy not being consumed by the energy consumer(s) 110, 110', 110" may not be absorbed by the energy storage system 104 since the energy storage system 104 may be "full". The fuel cell 106 hereby needs to be turned off or excess electric power generated by the fuel cell 106 needs to be dissipated. The following will describe various operating scenarios in order to arrive at an upcoming position at which the electric power system will assume the low load operation mode without having to turn off the fuel cell 106 or dissipate valuable electric energy. Reference is therefore now made to FIGS. 2 and 3.

Turning initially to FIG. 2, which illustrates the vehicle 10 operating at a road path 202 for arriving at an upcoming position 204 at which the crane will load material 206 to the vehicle 10. The upcoming position 204 will in the following with reference to FIG. 2 also be referred to as the position 204 for loading. When the vehicle 10 arrives at this upcoming position 204, the electric traction motor 101 will be turned off and the vehicle auxiliary 110", i.e. the crane, will consume electric energy from the electric power system 102 during loading. In detail, the electric motor 120 of the crane will consume electric energy when the vehicle 10 assumes a stand-still operating mode at the upcoming position 204. It should be readily understood that the distance 210 from the current position to the upcoming position 204 is merely schematically illustrated and the following description is of course valid for a distance being substantially larger than what is depicted in FIG. 2.

During operation, and before the vehicle 10 arrives at the upcoming position 204, processing circuitry of the control unit 114 determines that the vehicle 10 is heading towards the position 204 for operating the crane to load the material 206 to the vehicle, i.e. the electric power system 102 will at this position 204 assume the low load operation mode.

When the vehicle 10 is at the current position, i.e. at the distance 210 from the position 204 for loading, the processing circuitry determines a current state of charge level of the energy storage system 104. Based on the current state of charge level, the processing circuitry determines a power distribution scheme between the electric power system 102 and the electric traction motor for arriving at the position 204 for loading with a state of charge level below the predetermined threshold level. Thus, based on a predicted energy consumption of the electric traction motor 101 when operating the vehicle 10 the distance 210 to the position for loading, a suitable power distribution scheme can be determined. The power distribution scheme should thus ensure that the vehicle 10 will fulfil its mission to arrive at the position 204 for loading but once arriving at the position for loading, the state of charge level should be below the predetermined threshold level. The power distribution scheme may take the road topology into account where the energy storage system 104 may be charged from time to time when operating the electric traction motor to generate electric power during braking. Also, the fuel cell 106 may, when traveling the distance 210 to the position 204 for loading, potentially be operated to assume the power mode from time to time if this is required for arriving at the position for loading, although the fuel cell 106 should preferably be operated to assume the idle mode as much as possible. However, for at least a portion of a travelling distance from the current position to the upcoming position, the electric power system 102 is controlled to feed electric power solely from the energy storage system 104 to the electric traction motor 101, in particular when the current state of charge level of the energy storage system is above an upper threshold level.

The position 204 for loading can be determined by the processing circuitry based on previous vehicle usage. In particular, the processing circuitry may know from previous operations that the vehicle 10 will soon arrive at the position 204 for loading. The processing circuitry may also receive the position 204 from map data, such as e.g. a GPS, etc.

The electric power system 102 is thus controlled to be operated according to the power distribution scheme from the present position to the position 204 for loading, whereby the state of charge level of the energy storage system 104 will be below the predetermined threshold level.

The predetermined threshold level of the energy storage system 104 when arriving at the upcoming position 204 can be based on a desired state of charge level of the energy storage system 104 after the low load operation mode has ended. In particular, it could be desirable to have a sufficient state of charge level of the energy storage system 104 to operate the vehicle 10 at a road path 240 subsequent to the loading of material 206. The desired state of charge level of the energy storage system 104 is thus preferably based on topology data of the road path 240 operable by the vehicle 10 after the low load operation mode has ended, i.e. after the crane 110" has loaded the material 206 onto the vehicle 10 and the vehicle is ready for its next assignment. The topology data can thus serve as an indicator of a power distribution scheme between the electric power system 102 and the electric traction motor 101 when operating the subsequent road path 240. Put it differently, the processing circuitry may determine a level of electric power fed from the energy storage system 104 to the electric traction motor 101 during propulsion at the road path operable after loading the material 206, or the level of electric power fed to the energy storage system 104 from the electric traction motor 101 during braking at the road path operable after loading the material 206.

The processing circuitry may also determine an energy consumption level of the energy consumer during the low load operation mode. Hence, the processing circuitry determines how much energy being needed for operating the crane when loading the material 206. The processing circuitry may further determine a charging level of the energy storage system 104 by the fuel cell 106 during the low load operation mode. The predetermined threshold level of the energy storage system 104 when arriving at the upcoming position, i.e. the position for loading 204 the material, can hereby be based on the desired state of charge level when the low load operation mode has ended and a difference between the charging level of the energy storage system and the energy consumption level of the energy consumer. The predetermined threshold level is thus based on the energy level needed for subsequently operating the vehicle when the material 206 has been loaded to the vehicle, and the electric charging level of the energy storage system 104 while loading the material 206.

When the vehicle 10 arrives at the position 204 for loading, the electric power system 102 is controlled to feed electric power to the electric motor 120 of the crane. Preferably, the fuel cell 106 is controlled to assume the idle mode when the vehicle has arrived at the position for loading and the electric power system assumes the low load operation mode. Also, the electric power system 102 is also preferably controlled to feed electric power from the fuel cell 106 to the electric motor 120 of the crane.

The electric motor 120 of the crane may consume electric power at a power level below the power level generated by the fuel cell when the electric power system assumes the low load operation mode. Put it differently, the fuel cell 106, when assuming the idle mode, will generate more electric power than being consumed by the electric motor 120 of the crane. Since the state of charge level of the energy storage system 104 is below the predetermined threshold level, a difference between the electric power generated by the fuel cell and the electric power consumed by the energy consumer can hereby be fed from the fuel cell to the energy storage system. Electric energy will not need to be dissipated and the fuel cell 106 does not have to be turned off when loading the material 206 onto the vehicle 10.

Reference is now made to FIG. 3 which illustrates another situation at which the electric power system 102 is controlled in a similar vein as described above in relation to FIG. 2. In the FIG. 3 example, the upcoming position 304 is a position along the road at which a queue has been formed and the vehicle 10 will be arranged in a stand-still operating mode and the electric power system 102 will assume the low load operation mode. When arriving at the queue, the electric power system 102 will feed electric power to e.g. the vehicle headlights 110, the infotainment system 110', etc. Hence, these energy consumers will need electric power for their operation.

When the vehicle is located a distance 310 from the queue formation, the processing circuitry may receive a signal from e.g. a GPS system, an upper layer control system, etc. indicative of the upcoming stand-still operating mode. The processing circuitry can hereby determine a power distribution scheme in a similar manner as described above in relation to the FIG. 2 example, and control the electric power system accordingly. Once arriving at the queue formation, the electric power system 102 feeds electric power to the energy consumer, and excess electric power generated by the fuel cell 106 in the idle mode is fed from the fuel cell 106 to the energy storage system 104.

It should thus be readily understood that the electric power system 102 is controlled in the same manner for the exemplified embodiment of FIG. 3 as for the exemplified embodiment of FIG. 2.

Figure 4:
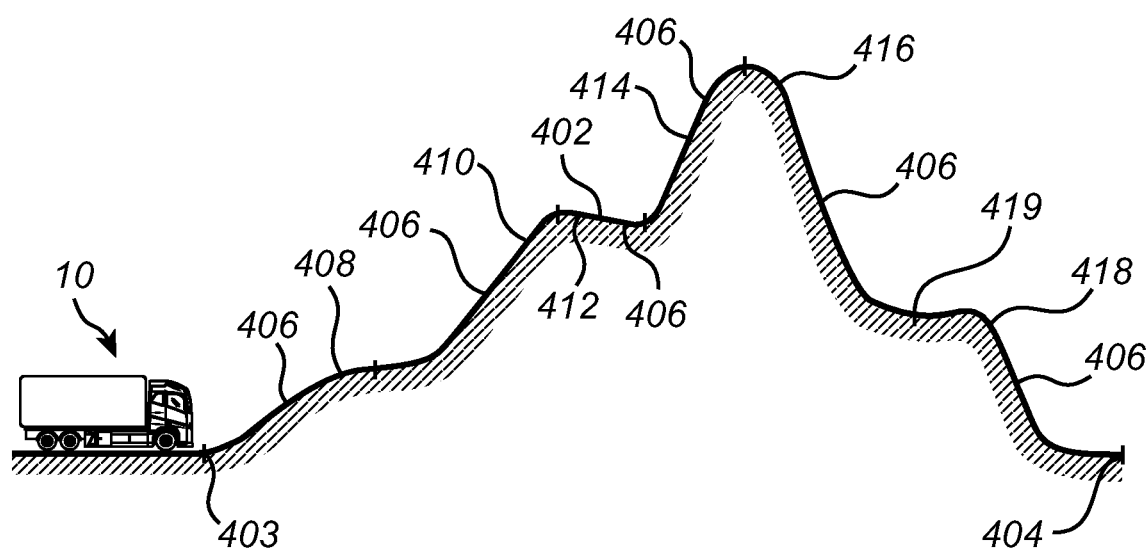
FIG. 4 is a schematic illustration of a road path operable by the FCEV according to an example embodiment.

Reference is now made to FIG. 4. 4 is a schematic illustration of an upcoming road path 402 operable by the vehicle 10 according to an example embodiment. The vehicle 10 is exemplified as operable between a current position 403 and an upcoming position 404 at which the electric power system 102 is operable to assume the low load operation mode. Before the vehicle 10 is leaving the current position 403, the processing circuitry divides the upcoming road path 402 into a plurality of road path sections 406. Thus, the sum of all road path sections 406 corresponds to the length of the upcoming road path 402. Each of the road path sections is associated with individual road topology data. As can be seen in FIG. 4, the first 408, second 410 and fourth 414 road path section are uphill slopes, where the electric power system 102 will feed power to the electric traction motor 101 for operating these sections, while the third 412, fifth 416 and sixth 418 road path sections are mainly downhill slopes, where the energy storage system 104 will receive electric power from the electric traction motor 101 during braking. The processing circuitry can hereby determine the electric energy consumption of the electric traction motor for each road path section 406.

The processing circuitry may preferably set a desired state of charge level of the energy storage system at the upcoming position 404. For operating the electric power system 102 to assume the low load operation mode at the upcoming position 404, the desired state of charge level should be below the predetermined threshold level. The processing circuitry further determines a desired electric energy capacity of the electric power system for each road path sections to arrive at the end position with the desired state of charge level of the energy storage system, whereby the desired electric energy capacity for each road path section being based on its next coming road path section. Put it differently, after the desired state of charge level at the upcoming position 404 has been determined, a desired electric energy capacity of the electric power system 102 is determined for the sixth road path section 418. A desired state of charge level at the start 419 of the sixth road path section 418 can hereby be determined. Thereafter, a desired electric energy capacity of the electric power system 102 is determined for the fifth road path section 416 based on the desired state of charge level at the start 419 of the sixth road path section 418, etc. The electric power system 102 can hereby be controlled from the current position 403 and for each road path section 406 to arrive at the upcoming position with the desired state of charge level which is below the predetermined threshold level.

Figure 5:
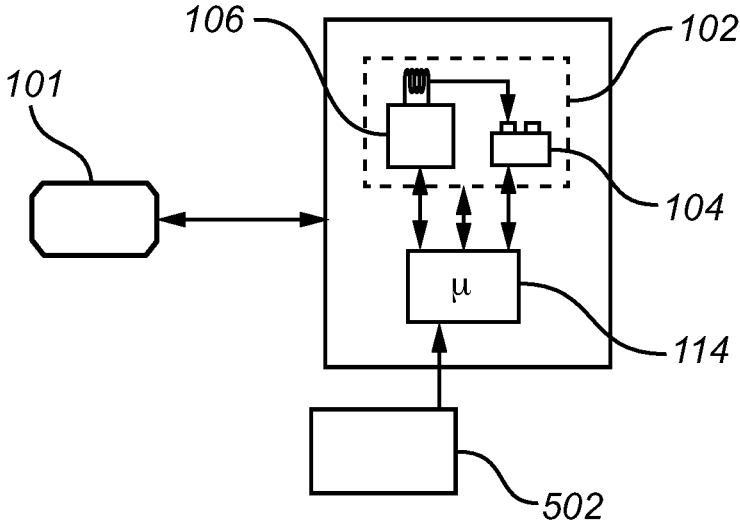
FIG. 5 is a schematic illustration of an electric power system of the FCEV according to an example embodiment.
Figure 6:
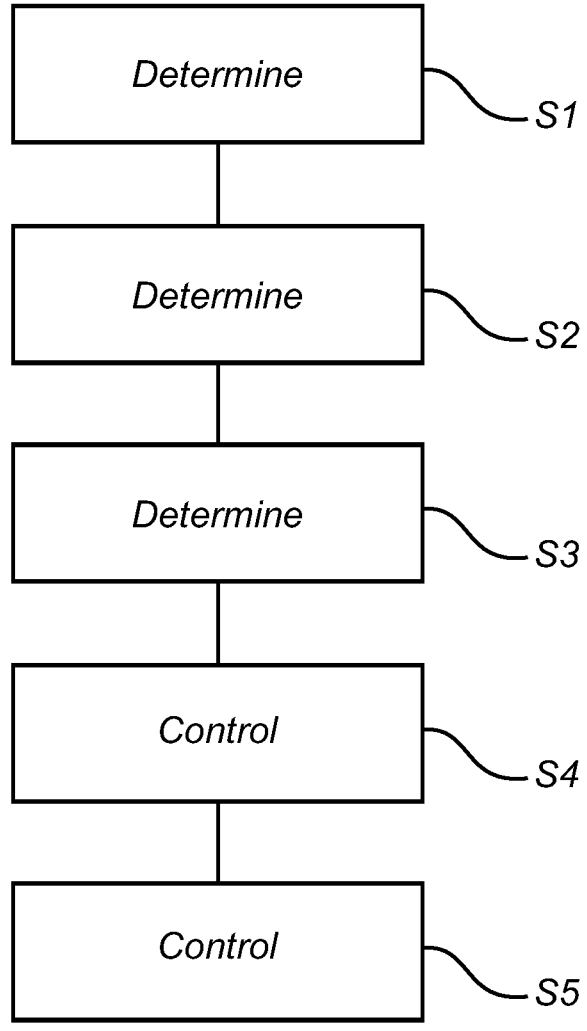
FIG. 6 is a flow chart of a method of controlling the electric power system according to an example embodiment.

Reference is now finally made to FIGS. 5 and 6 for describing the electric power system 102 and the method of controlling the electric power system in further detail. During operation, an upcoming position 204, 304, 404 is determined S2 by the processing circuitry of the control unit 114. The upcoming position 204, 304, 404 may be received from a position location module 502. The position location module 502 may determine the upcoming position according to any of the above-described example, such as based on previous vehicle usage, map data, etc.

The processing circuitry determines S2 a current state of charge level of the energy storage system 104. Preferably, a signal is transmitted from the energy storage system 104 to the processing circuitry such that the processing circuitry can determine this information. Further, a power distribution scheme between the electric power system 102 and the electric traction motor 101 for arriving at the upcoming position with a state of charge level of the energy storage system below a predetermined threshold level is determined S3. Based on the power distribution scheme, the electric power system 102 is controlled S4 to e.g. feed electric power to the electric traction motor 101 during propulsion and to receive electric power from the electric traction motor 101 during braking. Also, the electric power system 102 may be controlled to e.g. feed electric power solely from the fuel cell 106, solely from the energy storage system 104 or from a combination of the fuel cell 106 and the energy storage system 104 to the electric traction motor 101 based on the power distribution scheme.

Finally, when arriving at the upcoming position 204, 304, 404 with a state of charge level below the predetermined threshold level, and when the electric power system 102 assumes the low load operation mode, the electric power system 102 is controlled S5 to feed electric power at least to the energy consumer 110, 110', 110".

It is to be understood that the present disclosure is not limited to the examples described above and illustrated in the drawings; rather, the skilled person will recognize that many changes and modifications may be made within the scope of the appended claims. For example, the low load operation mode may that occurs when the operator of the vehicle is having a break, and the energy consumer is in such situation control unit(s) operating in the vehicle to keep track of vehicle alarm systems, etc.

The invention claimed is:

1. A computer implemented method of controlling an electric power system of a fuel cell electric vehicle (FCEV), the electric power system comprising a fuel cell and an energy storage system electrically connected to each other, wherein the FCEV comprises an electric traction motor connected to the electric power system, the electric power system being configured to feed electric power to the electric traction motor at a propulsion power level range during propulsion, and to receive electric power, generated by the electric traction motor, during braking, the electric power system being operable to assume a low load operation mode, in which electric power is fed to an energy consumer of the FCEV at a power level below the propulsion power level range, the energy consumer being different from the electric traction motor, and processing circuitry operatively coupled to the energy storage system, the method comprising:

determining, by the processing circuitry, an upcoming position at which the electric power system will assume the low load operation mode;

determining, by the processing circuitry, a current state of charge level of the energy storage system;

determining, by the processing circuitry, a desired state of charge level of the energy storage system when ending the low load operation mode;

determining, by the processing circuitry, an energy consumption level of the energy consumer during the low load operation mode;

determining, by the processing circuitry, a charging level of the energy storage system by the fuel cell during the low load operation mode;

determining, by the processing circuitry, a power distribution scheme between the electric power system and the electric traction motor for arriving at the upcoming position with a state of charge level of the energy storage system below a predetermined threshold level, wherein the predetermined threshold level of the energy storage system when arriving at the upcoming position is based on the desired state of charge level and a difference between the charging level of the energy storage system and the energy consumption level of the energy consumer;

controlling, by the processing circuitry, the electric power system based on the power distribution scheme; and controlling, by the processing circuitry, the electric power system to feed electric power from the fuel cell at least to the energy consumer when the electric power system assumes the low load operation mode at the upcoming position.

2. The computer implemented method according to claim 1, wherein the desired state of charge level of the energy storage system is based on topology data of a road path operable by the FCEV after the low load operation mode has ended.

3. The computer implemented method according to claim 1, further comprising:

determining, by the processing circuitry, an electric energy consumption of the electric traction motor for arriving at the upcoming position;

wherein the power distribution scheme is based on the determined electric energy consumption.

4. The computer implemented method according to claim 3, wherein the determined electric energy consumption is based on scheduled operational information of the electric traction motor for propelling the FCEV from a present position to the upcoming position.

5. The computer implemented method according to claim 3, further comprising:

determining, by the processing circuitry, a road topology for a road path from a present position to the upcoming position to be operated by the FCEV; and wherein the determined electric energy consumption is based on the road topology from the present position to the upcoming position.

6. The computer implemented method according to claim 3, further comprising:

dividing, by the processing circuitry, an upcoming road path from a current position to the upcoming position into a plurality of road path sections, each road path section being associated with individual road topology data;

wherein the electric energy consumption of the electric traction motor is determined for each road path section.

7. The computer implemented method according to claim 6, further comprising:

setting, by the processing circuitry, a desired state of charge level of the energy storage system at the upcoming position, the desired state of charge level being below the predetermined threshold level;

determining, by the processing circuitry, a desired electric energy capacity of the electric power system for each road path sections to arrive at the upcoming position with the desired state of charge level of the energy storage system, the desired electric energy capacity for each road path section being based on its next coming road path section; and controlling, by the processing circuitry, the electric power system based on the desired electric energy capacity of each road path section.

8. The computer implemented method according to claim 1, further comprising:

controlling, by the processing circuitry, the electric power system to feed electric power solely from the energy storage system to the electric traction motor during at least a portion of a travelling distance from a present position to the upcoming position when the current state of charge level of the energy storage system is above an upper threshold level.

9. The computer implemented method according to claim 1, wherein the fuel cell is operable to assume an idle mode in which the fuel cell generates electric power at a first power level, and a power mode in which the fuel cell generates electric power at a second power level, the second power level being higher than the first power level.

10. The computer implemented method according to claim 9, wherein the fuel cell assumes the idle mode when the electric power system assumes the low load operation mode.

11. The computer implemented method according to claim 9, wherein the fuel cell assumes the idle mode when the electric power system is controlled to feed electric power from the energy storage system to the electric traction motor for arriving at the upcoming position.

12. The computer implemented method according to claim 1, wherein the FCEV is arranged in a stand-still operating mode when the electric power system assumes the low load operation mode.

13. The computer implemented method according to claim 1, wherein the energy consumer is a vehicle auxiliary system electrically connected to the electric power system.

14. The computer implemented method according to claim 1, wherein the energy consumer consumes electric power at a power level below the power level generated by the fuel cell when the electric power system assumes the low load operation mode, wherein a difference between electric power generated by the fuel cell and the electric power consumed by the energy consumer is fed from the fuel cell to the energy storage system when the electric power system assumes the low load operation mode.

15. The computer implemented method according to claim 1, the method further comprising:

determining, by the processing circuitry, the upcoming position at which the electric power system will assume the low load operation mode based on previous vehicle usage.

16. The computer implemented method according to claim 1, the method further comprising:

determining, by the processing circuitry, the upcoming position at which the electric power system will assume the low load operation mode based on map data.

17. An electric power system of a fuel cell electric vehicle (FCEV), the electric power system comprising a fuel cell, an energy storage system electrically connected to the fuel cell, and a control unit connected to the fuel cell, the electric power system being configured to feed electric power to an electric traction motor of the FCEV during propulsion at a propulsion power level range, and to assume a low load operation mode in which the electric power system feeds electric power to an energy consumer of the FCEV at a power level below the propulsion power level range, the energy consumer being different from the electric traction motor, the control unit being configured to:

determine an upcoming position in which the electric power system will assume the low load operation mode;

determine a current state of charge level of the energy storage system;

determine a desired state of charge level of the energy storage system when ending the low load operation mode;

determine an energy consumption level of the energy consumer during the low load operation mode;

determine a charging level of the energy storage system by the fuel cell during the low load operation mode;

determine a power distribution scheme between the electric power system and the electric traction motor for arriving at the upcoming position with a state of charge level of the energy storage system below a predetermined threshold level, wherein the predetermined threshold level of the energy storage system when arriving at the upcoming position is based on the desired state of charge level and a difference between the charging level of the energy storage system and the energy consumption level of the energy consumer;

control the electric power system based on the power distribution scheme; and control the electric power system to feed electric power from the fuel cell at least to the energy consumer when the electric power system assumes the low load operation mode at the upcoming position.

18. A fuel cell electric vehicle (FCEV) comprising an electric power system according to claim 17.

19. A non-transitory computer readable medium carrying a computer program comprising program code for performing the method of claim 1 when the program product is run on a control unit.

20. A control unit for controlling an auxiliary system of a transportation vehicle, the control unit being configured to perform the method according to claim 1.

* * * * *